United States Patent
Lee et al.

(10) Patent No.: US 9,425,925 B2
(45) Date of Patent: Aug. 23, 2016

(54) METHOD FOR OPERATING HARQ TO CHANGE DYNAMIC RESOURCE OF WIRESS RESOURCE IN WIRELESS COMMUNICATION SYSTEM, AND APPARATUS THEREFOR

(71) Applicant: LG ELECTRONICS INC., Seoul (KR)

(72) Inventors: Seungmin Lee, Anyang-si (KR);
Hanbyul Seo, Anyang-si (KR);
Hakseong Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 15 days.

(21) Appl. No.: 14/380,897

(22) PCT Filed: Mar. 26, 2013

(86) PCT No.: PCT/KR2013/002495
§ 371 (c)(1),
(2) Date: Aug. 25, 2014

(87) PCT Pub. No.: WO2013/147490
PCT Pub. Date: Oct. 3, 2013

(65) Prior Publication Data
US 2015/0016318 A1  Jan. 15, 2015

Related U.S. Application Data

(60) Provisional application No. 61/615,885, filed on Mar. 26, 2012, provisional application No. 61/778,409, filed on Mar. 12, 2013.

(51) Int. Cl.
*H04L 1/18* (2006.01)
*H04L 5/14* (2006.01)
(Continued)

(52) U.S. Cl.
CPC ............. *H04L 1/1861* (2013.01); *H04L 5/14* (2013.01); *H04L 1/1812* (2013.01); *H04L 5/0055* (2013.01); *H04L 5/1469* (2013.01); *H04W 72/0446* (2013.01)

(58) Field of Classification Search
CPC ...................................... H04L 1/1812
USPC .................. 370/280, 242, 310, 329, 331
See application file for complete search history.

(56) References Cited

U.S. PATENT DOCUMENTS 7,792,130 B2 * 9/2010 Fischer ............... G08C 17/02
370/310
8,155,053 B2 * 4/2012 Wang ................. H04L 1/1867
370/328

(Continued)

FOREIGN PATENT DOCUMENTS

KR  10-2012-0005515 A  1/2012

OTHER PUBLICATIONS

Samsung, "DL/UL HARQ-ACK Transmission in CA with Different TDD UL-DL Configurations", 3GPP TSG RAN WG1 #66, R1-113081, Zhuhai, China, Oct. 14, 2011.

(Continued)

*Primary Examiner* — Andrew Lai
*Assistant Examiner* — Andrew C Lee
(74) *Attorney, Agent, or Firm* — Dentons US LLP

(57) ABSTRACT

The present application discloses a method for executing a hybrid automatic repeat and request (HARQ) process from a particular layer at a receiving end in a wireless communication system. Specifically, the method comprises the steps of: receiving predetermined information regarding one or more HARQ processes from a subordinate layer so as to change a configuration of a previously configured first uplink/downlink subframe configuration to a configuration of a second uplink/downlink subframe configuration; and processing one or more HARQ processes on the basis of the predetermined information when changing to the second uplink/downlink subframe configuration, wherein the one or more HARQ processes are HARQ processes, from among the HARQ processes linked to the first uplink/downlink subframe configuration, which cannot be linked to the second uplink/downlink subframe configuration.

12 Claims, 11 Drawing Sheets

(51) Int. Cl.
*H04L 5/00* (2006.01)
*H04W 72/04* (2009.01)

(56) References Cited

U.S. PATENT DOCUMENTS

| | | | | |
|---|---|---|---|---|
| 8,228,947 | B2* | 7/2012 | Pirskanen | H04L 1/1621 370/470 |
| 8,527,829 | B2* | 9/2013 | Fong | H04L 1/1812 370/330 |
| 2006/0146761 | A1* | 7/2006 | Kim | H04W 72/1284 370/335 |
| 2007/0041342 | A1* | 2/2007 | Usuda | H04W 28/22 370/329 |
| 2007/0047451 | A1* | 3/2007 | Lohr | H04L 1/1887 370/242 |
| 2007/0047452 | A1* | 3/2007 | Lohr | H04B 7/2612 370/242 |
| 2007/0073895 | A1* | 3/2007 | Sebire | H04L 47/10 709/230 |
| 2008/0045272 | A1 | 2/2008 | Wang et al. | |
| 2008/0125134 | A1* | 5/2008 | Usuda | H04L 1/0002 455/452.1 |
| 2009/0149189 | A1* | 6/2009 | Sammour | H04L 1/165 455/450 |
| 2009/0175241 | A1* | 7/2009 | Ohta | H04W 36/02 370/331 |
| 2010/0091734 | A1* | 4/2010 | Park | H04W 92/20 370/331 |
| 2010/0169732 | A1* | 7/2010 | Wu | H04L 1/189 714/748 |
| 2010/0208667 | A1* | 8/2010 | Chun | H04W 72/1289 370/329 |
| 2011/0041027 | A1 | 2/2011 | Fong et al. | |
| 2012/0039299 | A1* | 2/2012 | Teyeb | H04B 7/2606 370/331 |
| 2012/0057547 | A1* | 3/2012 | Lohr | H04L 5/0007 370/329 |
| 2013/0223307 | A1* | 8/2013 | Ohlsson | H04W 52/0216 370/311 |

OTHER PUBLICATIONS

LG Electronics, "Discussion on Different TDD UL/DL Configurations for Inter-Band CA", 3GPP TSG RAN WG1 #66bis, R1-113185, Zhuhai, China, Oct. 14, 2011.

* cited by examiner

FIG. 2
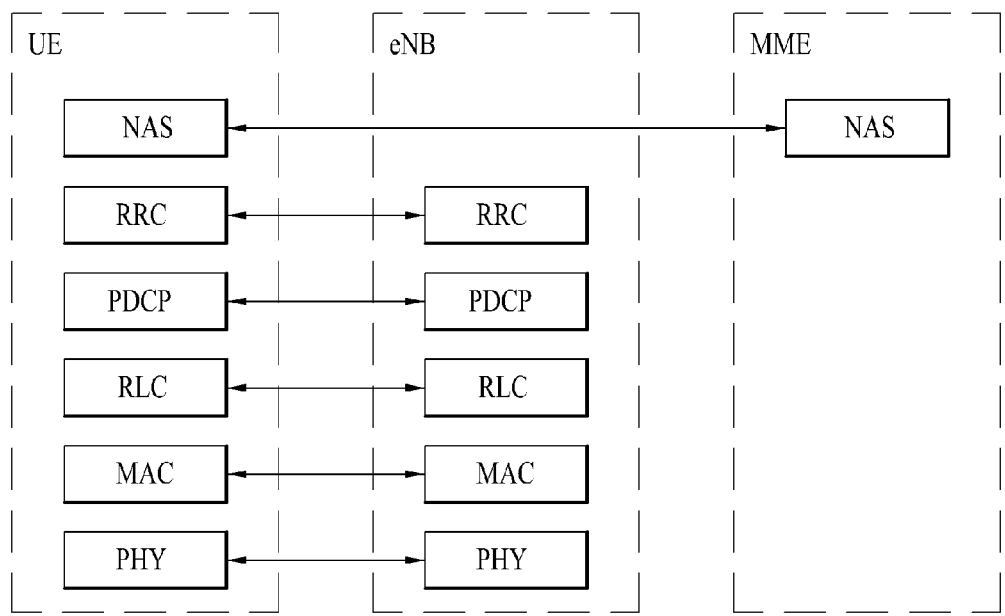
(a) CONTROL-PLANE PROTOCOL STACK
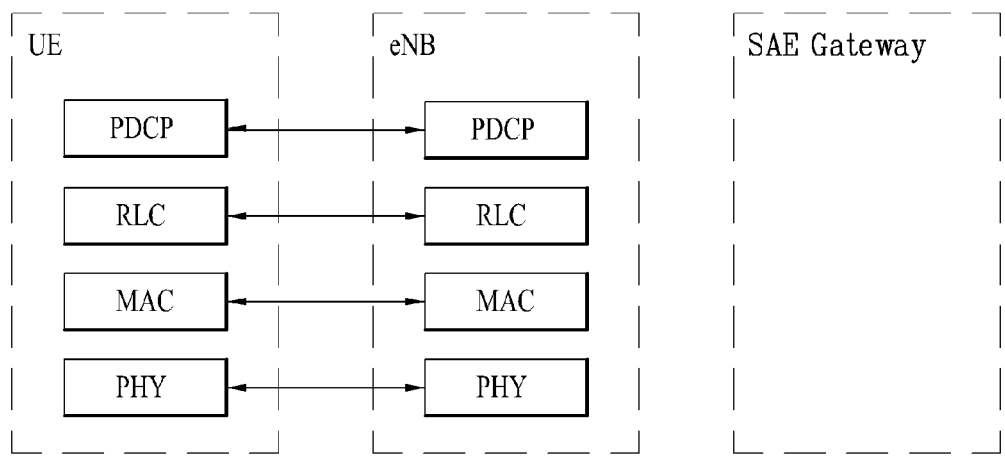
(b) USER-PLANE PROTOCOL STACK

METHOD FOR OPERATING HARQ TO CHANGE DYNAMIC RESOURCE OF WIRESS RESOURCE IN WIRELESS COMMUNICATION SYSTEM, AND APPARATUS THEREFOR

This application is a National Stage Entry of International Application No. PCT/KR2013/002495 filed Mar. 26, 2013, which claims priority to U.S. Provisional Application Nos. 61/615,885 filed Mar. 26, 2012 and 61/778,409 filed Mar. 12, 2013, all of which are incorporated herein by reference.

TECHNICAL FIELD

The present invention relates to a wireless communication system and, more particularly, to a method for performing hybrid automatic repeat and request (HARQ) for dynamic resource change of a radio resource in a wireless communication system and an apparatus therefor.

BACKGROUND ART

As an example of a wireless communication system to which the present invention is applicable, a $3^{rd}$ Generation Partnership Project (3GPP) Long Term Evolution (LTE) communication system will be schematically described.

FIG. 1 is a diagram showing a network structure of an Evolved Universal Mobile Telecommunications System (E-UMTS) as a wireless communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "$3^{rd}$ Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.44, 3, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include an AG, a network node for user registration of the UE, etc. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DISCLOSURE

Technical Problem

An object of the present invention devised to solve the problem lies in a method for performing hybrid automatic repeat and request (HARQ) for dynamic resource change of a radio resource in a wireless communication system and an apparatus therefor.

Technical Solution

The object of the present invention can be achieved by providing a method for performing hybrid automatic repeat and request (HARQ) at a specific layer of a receiver in a wireless communication system including receiving predetermined information about one or more HARQ processes from a lower layer in order to change a predetermined first uplink/downlink configuration to a second uplink/downlink configuration, processing the one or more HARQ processes based on the predetermined information when changing to the second uplink/downlink configuration, wherein the one or more HARQ processes are HARQ processes, which cannot be linked to the second uplink/downlink configuration, among HARQ processes linked to the first uplink/downlink configuration.

The method may further include receiving the predetermined information from a transmitter via a physical layer signal.

The predetermined information may include identifiers of the one or more HARQ processes. The predetermined information may include a sequence number of a service data unit (SDU) retransmitted by the one or more HARQ processes.

The processing the one or more HARQ processes may include terminating the one or more HARQ processes when changing to the second uplink/downlink configuration. Alternatively, the processing the one or more HARQ processes may include terminating the one or more HARQ processes after a specific timer has elapsed, when changing to the second uplink/downlink configuration. A value of the specific timer may be received from the lower layer along with the predetermined information. In this case, the method may further include flushing a service data unit corresponding to the one or more HARQ processes stored in a buffer.

When the first uplink/downlink configuration is changed to the second uplink/downlink configuration, the number of downlink HARQ processes may be decreased.

The specific layer may be a radio link control (RLC) layer and the lower layer may be a medium access control (MAC) layer. The wireless communication system may be a time division duplex (TDD) system.

Advantageous Effects

According to embodiments of the present invention, it is possible to efficiently perform a HARQ process for dynamic resource change of a radio resource in a wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 is a diagram showing a control plane and a user plane of a radio interface protocol architecture between a User Equipment (UE) and an Evolved Universal Terrestrial Radio Access Network (E-UTRAN) based on a $3^{rd}$ Generation Partnership Project (3GPP) radio access network standard.

BEST MODE

Figure 1:
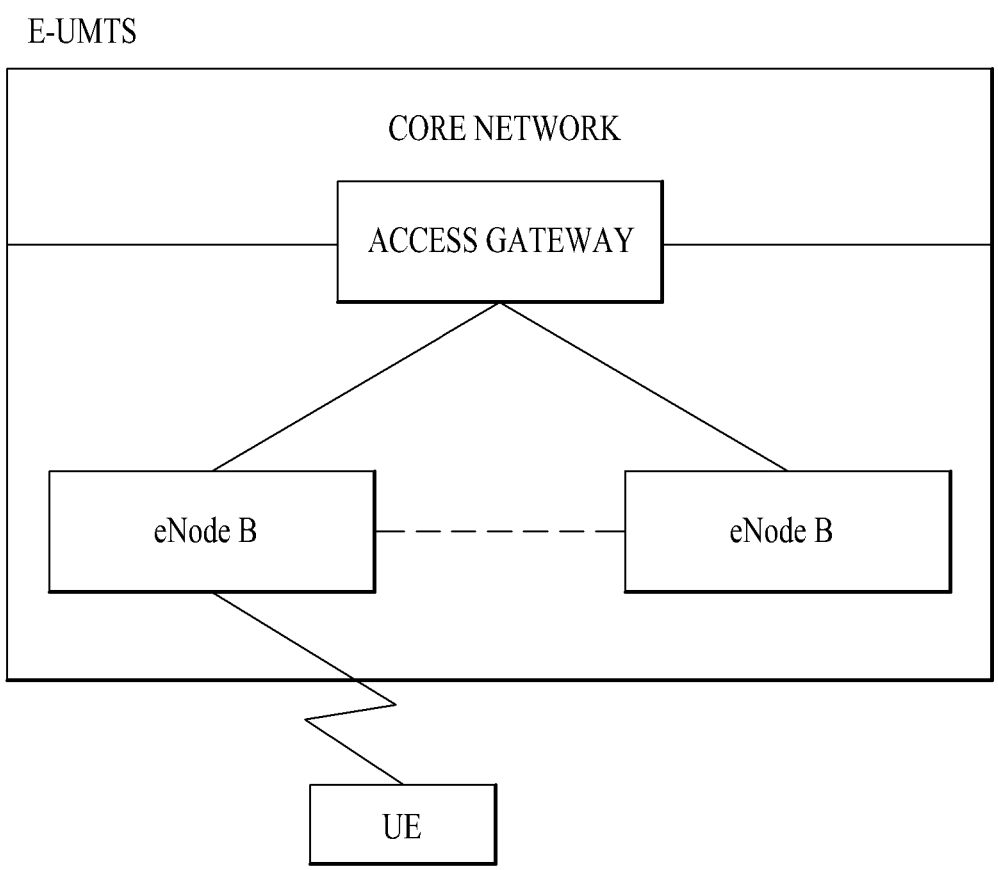
FIG. 1 is a diagram showing a network structure of an Evolved Universal Mobile Telecommunications System (E-UMTS) as an example of a wireless communication system.

The configuration, operation and other features of the present invention will be understood by the embodiments of the present invention described with reference to the accompanying drawings. The following embodiments are examples of applying the technical features of the present invention to a $3^{rd}$ Generation Partnership Project (3GPP) system.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

One cell of the eNB is set to use a bandwidth such as 1.4, 3, 5, 10, 15 or 20 MHz to provide a downlink or uplink transmission service to UEs. Different cells may be set to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
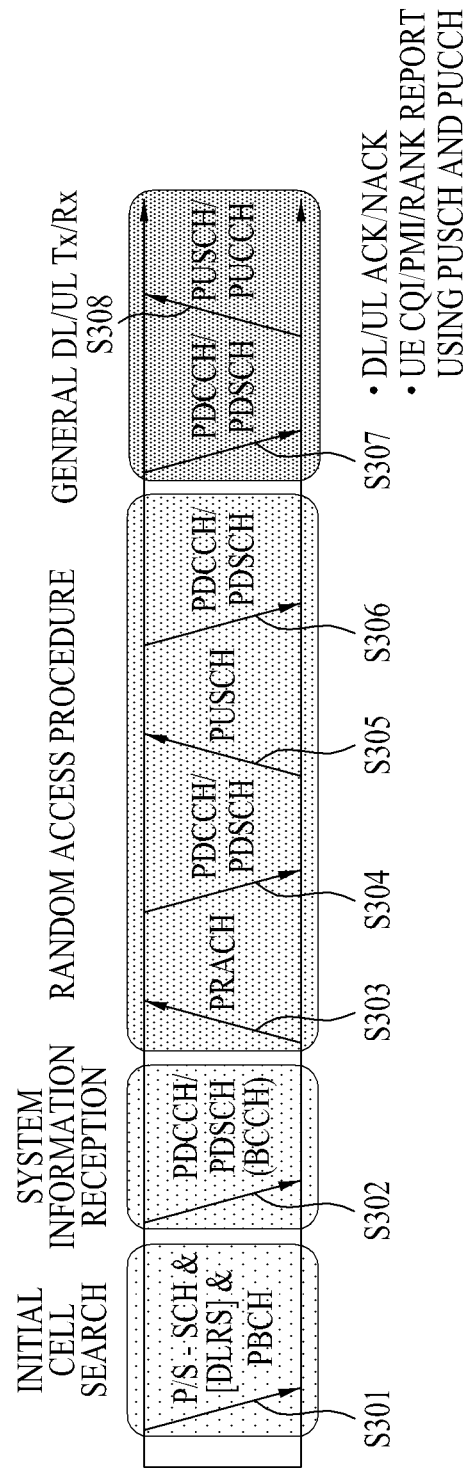
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE, which has completed the initial cell search, may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE, which has performed the above procedures, may perform PDCCH/PDSCH reception (S307) and Physical Uplink Shared Channel PUSCH)/Physical Uplink Control Channel (PUCCH) transmission (S308) as a general uplink/downlink signal transmission procedure. In particular, the UE receives downlink control information (DCI) through a PDCCH. Here, the DCI includes control information such as resource allocation information of the UE and the format thereof differs according to the use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
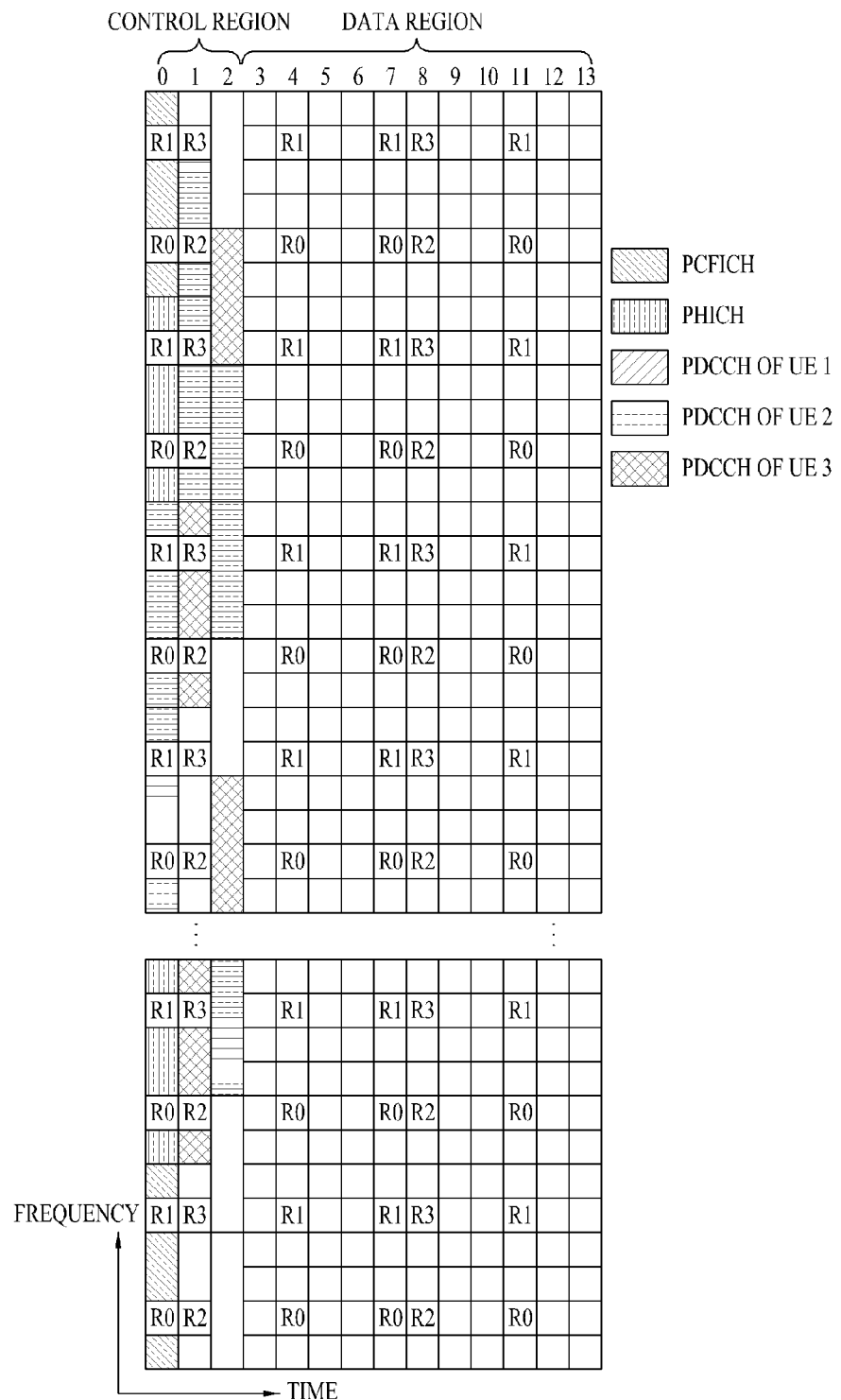
FIG. 4 is a diagram showing the structure of a downlink radio frame used in a Long Term Evolution (LTE) system.

FIG. 4 is a diagram showing a control channel included in a control region of one subframe in a downlink radio frame.

Referring to FIG. 4, a subframe includes 14 OFDM symbols. The first to third OFDM symbols are used as a control region and the remaining 13 to 11 OFDM symbols are used as a data region, according to subframe configuration. In FIG. 4, R1 to R4 denote reference signals (RS) or pilot signals for antennas 0 to 3. The RS is fixed to a constant pattern within a subframe regardless of the control region and the data region. A control channel is allocated to resources, to which the RS is not allocated, in the control region, and a traffic channel is also allocated to resources, to which the RS is not allocated, in the control region. Examples of the control channel allocated to the control region include a Physical Control Format Indicator Channel (PCFICH), a Physical Hybrid-ARQ Indicator Channel (PHICH), a Physical Downlink Control Channel (PDCCH), etc.

The Physical Control Format Indicator Channel (PCFICH) informs the UE of the number of OFDM symbols used for the PDCCH per subframe. The PCFICH is located at a first OFDM symbol and is configured prior to the PHICH and the PDCCH. The PCFICH includes four Resource Element Groups (REGs) and the REGs are dispersed in the control region based on a cell identity (ID). One REG includes four resource elements (REs). The PCFICH has a value of 1 to 3 or 2 to 4 according to bandwidth and is modulated using a Quadrature Phase Shift Keying (QPSK) scheme.

The Physical Hybrid-ARQ Indicator Channel (PHICH) is used to carry HARQ ACK/NACK for uplink transmission. That is, the PHICH refers to a channel via which DL ACK/NACK information for uplink HARQ is transmitted. The PHICH includes one REG and is scrambled on a cell-specific basis. ACK/NACK is indicated by one bit and is modulated using a binary phase shift keying (BPSK) scheme. The modulated ACK/NACK is repeatedly spread with a spreading factor (SF) of 2 or 4. A plurality of PHICHs mapped to the same resources configures a PHICH group. The number of PHICHs multiplexed in the PHICH group is determined according to the number of spreading codes. The PHICH (group) is repeated three times in order to obtain diversity gain in a frequency region and/or time region.

The Physical Downlink Control Channel (PDCCH) is allocated to the first n OFDM symbols of a subframe. Here, n is an integer of 1 or more and is indicated by a PCFICH. The PDCCH includes one or more Control Channel Elements (CCEs). The PDCCH informs each UE or a UE group of information associated with resource allocation of a Paging Channel (PCH) and a Downlink-Shared Channel (DL-SCH), both of which are transport channels, uplink scheduling grant, HARQ information, etc. The paging channel (PCH) and the downlink-shared channel (DL-SCH) are transmitted through a PDSCH. Accordingly, the eNB and the UE transmit and receive data through the PDSCH except for specific control information or specific service data.

Information indicating to which UE (one or a plurality of UEs) data of the PDSCH is transmitted and information indicating how the UEs receive and decode the PDSCH data are transmitted in a state of being included in the PDCCH. For example, it is assumed that a specific PDCCH is CRC-masked with a Radio Network Temporary Identity (RNTI) "A", and information about data transmitted using a radio resource (e.g., frequency location) "B" and transmission format information (e.g., transmission block size, modulation scheme, coding information, or the like) "C" is transmitted via a specific subframe. In this case, one or more UEs located within a cell monitor a PDCCH using its own RNTI information, and if one or more UEs having "A" RNTI are present, the UEs receive the PDCCH and receive the PDSCH indicated by "B" and "C" through the information about the received PDCCH.

Figure 5:
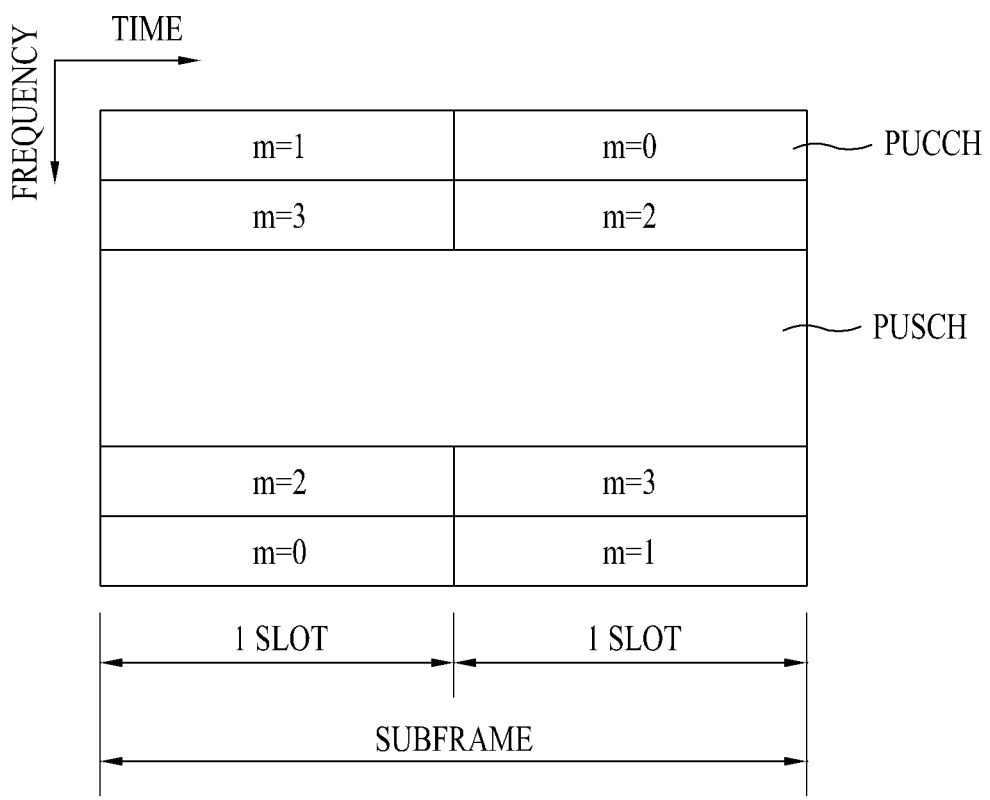
FIG. 5 is a diagram showing the structure of an uplink radio frame used in an LTE system.

FIG. 5 is a diagram showing the structure of an uplink subframe used in an LTE system.

Figure 6:
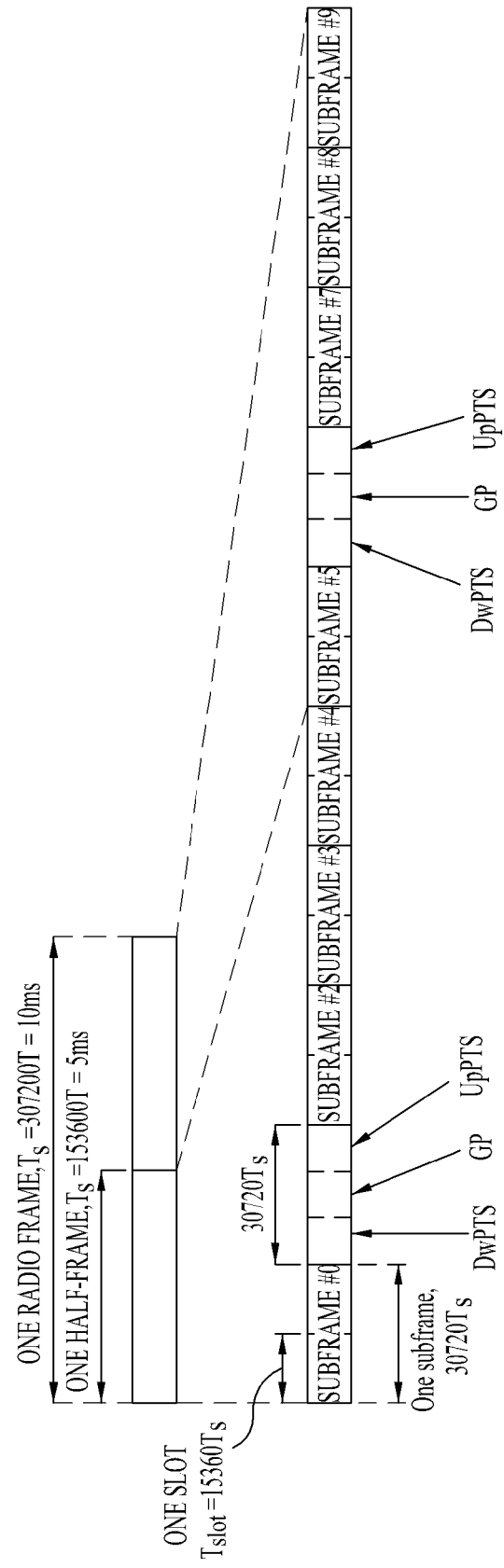
FIG. 6 is a diagram showing the structure of a radio frame used in an LTE TDD system.

Referring to FIG. 5, an uplink subframe may be divided into a region to which a Physical Uplink Control Channel (PUCCH) carrying uplink control information is allocated and a region to which a Physical Uplink Shared Channel (PUSCH) carrying user data is allocated. A middle portion of the subframe is allocated to the PUSCH and both sides of a data region in a frequency domain are allocated to the PUCCH. Uplink control information transmitted on the PUCCH includes an ACK/NACK signal used for HARQ, a Channel Quality Indicator (CQI) indicating a downlink channel status, a rank indicator (RI) for MIMO, a scheduling request (SR) which is an uplink radio resource allocation request, etc. The PUCCH for one UE uses one resource block occupying different frequencies in slots within the subframe. Two slots use different resource blocks (or subcarriers) within the subframe. That is, two resource blocks allocated to the PUCCH are frequency-hopped in a slot boundary. FIG. 6 shows the case in which a PUCCH having m=0, a PUCCH having m=1, a PUCCH having m=2, and a PUCCH having m=3 are allocated to the subframe.

FIG. 6 is a diagram showing the structure of a radio frame in an LTE TDD system. In an LTE TDD system, the radio frame includes two half frames, each of which includes four normal subframes including two slots and a special subframe including a downlink pilot time slot (DwPTS), a guard period (GP), and an uplink pilot time slot (UpPTS).

In the special subframe, the DwPTS is used for initial cell search, synchronization and channel estimation at a user equipment. The UpPTS is used for channel estimation of a base station and uplink transmission synchronization of the user equipment. That is, the DwPTS is used for downlink transmission and the UpPTS is used for uplink transmission. In particular, the UpPTS is used for PRACH preamble or SRS transmission. The guard period is used to remove interference occurring in uplink due to multi-path delay of a downlink signal between uplink and downlink.

The special subframe is currently defined as shown in Table 1 below in the 3GPP standard. Table 1 shows the DwPTS and the UpPTS in case of $T_s=1/(15000\times2048)$. The remaining region is configured as a guard period.

mined by the MAC entity is configured and delivered to the MAC entity. The RLC entity located at the UE also configures a lower unit, that is, an RLC PDU according to the size of a radio resource indicated by the MAC layer. That is, when the RLC entity of the UE delivers the RLC PDU to the MAC layer, data having a size determined by the MAC entity is configured and the RLC PDU is delivered to the MAC entity.

The RLC layer provides three RLC modes, that is, an unacknowledged mode (UM), an acknowledged mode (AM) and a transparent mode (TM), in order to support a variety of QoSs. Since the three RLC modes support different QoSs, the three RLC modes are different in terms of operation method and detailed function. Accordingly, the RLC modes need to be examined according to operation method.

Hereinafter, the RLC of the UM is abbreviated to a UM RNC and the RLC of the AM is abbreviated to an AM RNC.

TABLE 1

| | | Normal cyclic prefix in downlink | | | Extended cyclic prefix in downlink | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

In the LTE TDD system, an uplink/downlink (UL/DL) configuration is shown in Table 2 below.

TABLE 2

| Uplink-downlink configuration | Downlink-to-Uplink Switch-point periodicity | Subframe number | | | | | | | | | |
| | | 0 | 1 | 2 | 3 | 4 | 5 | 6 | 7 | 8 | 9 |
| --- | --- | --- | --- | --- | --- | --- | --- | --- | --- | --- | --- |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2 above, D denotes a downlink subframe, U denotes an uplink subframe and S denotes the special subframe. Table 2 above shows a downlink-to-uplink switch-point periodicity in the UL/DL configuration in each system.

Hereinafter, the RLC layer described with reference to FIG. 2 will be described in detail. The basic function of the RLC layer includes guarantee of Quality of Service (QoS) of each radio bearer (RB) and data transmission. Since the RB service is provided to a higher layer by a second layer of a radio protocol, the whole second layer influences QoS and, above all, influence of the RLC layer is particularly large. The RLC layer has an independent RLC entity per RB in order to guarantee QoS of the RB. The RLC entity configures a lower unit, that is, an RLC protocol data unit (PDU) according to the size of a radio resource determined by the MAC layer.

That is, when the RLC entity located at the eNB delivers the RLC PDU to the MAC layer, data having a size deter- The UM RLC attaches a PDU header including a sequence number (SN) to each PDU to enable a receiver to check which PDU is lost during transmission. Due to such a function, the UM RLC is responsible for transmission of broadcast/multi-cast data or for transmission of real-time packet data such as voice data of a packet service (PS) domain or streaming on a user plane and is responsible for transmission of an RRC message, which does not require acknowledgement, among RRC messages transmitted to a specific UE or a specific UE group of a cell on a control plane. However, a retransmission function is not supported.

The AM RLC configures the PDU by attaching the PDU header including the SN, similarly to the UM RLC, but is different from the UM RLC in that a receiver transmits acknowledgement in response to the PDU transmitted by a transmitter. In the AM RLC, the receiver transmits acknowledgement in order to request retransmission of the PDU, which is not received, from the transmitter. The retransmission function is a most significant feature of the AM RLC. As a result, the AM RLC serves to guarantee error-free data transmission via retransmission. For such a purpose, the AM RLC is responsible for transmission of non-real-time packet data such as TCP/IP data of a PS domain on a user plane and is responsible for transmission of an RRC message, which requires acknowledgement, among RRC messages transmitted to a specific UE of a cell on a control plane.

In terms of directivity, the UM RLC is used for unidirectional communication, whereas the AM RLC is used for bidirectional communication because feedback from a receiver is performed. Since such bidirectional communication is mainly used for point-to-point communication, the AM RLC uses a dedicated logical channel only. The UM RLC and the AM RLC differ in terms of structure. That is, one RLC entity has either a transmission or reception structure only in the UM RLC, whereas one RLC entity has a transmitter and a receiver in the AM RLC.

That is, ARQ information is used in the AM mode but ARQ information is not used in the UM mode. Here, the ARQ information is transmission/reception acknowledgement information, which means information about a data block which is received or is not received by the receiver.

Lastly, an RLC SDU is delivered to the MAC layer without adding header information. A retransmission function of reception error is not supported.

Hereinafter, a HARQ scheme in an LTE system will be described in detail.

Figure 7:
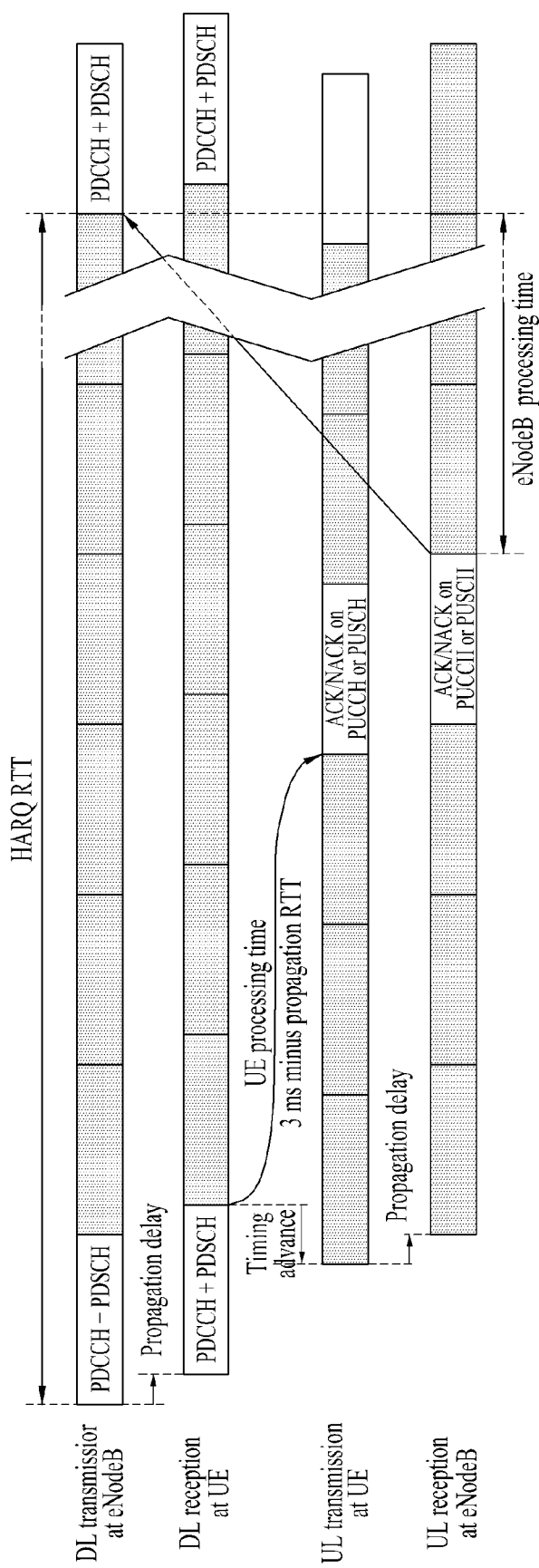
FIG. 7 is a diagram showing a downlink HARQ process in an LTE FDD system.
Figure 8:
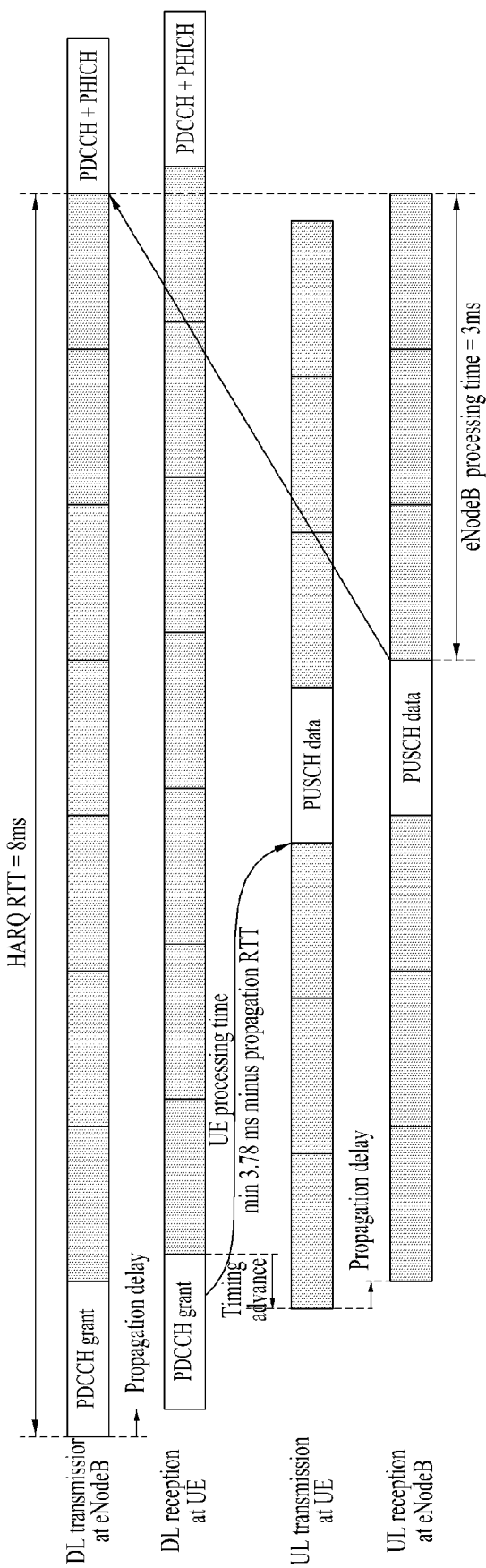
FIG. 8 is a diagram showing an uplink HARQ process in an LTE FDD system.

In an LTE FDD system, eight stop-and-wait (SAW) HARQ processes with a constant round-trip time of 8 ms are supported in uplink and downlink. FIG. 7 is a diagram showing a downlink HARQ process in an LTE FDD system, and FIG. 8 is a diagram showing an uplink HARQ process in an LTE FDD system.

Each HARQ process is defined by a unique HARQ process identifier having a size of 3 bits and individual soft buffer assignment for combination of retransmitted data is required in a receiver (a UE in a downlink HARQ process and an eNodeB in an uplink HARQ process). In an LTE system, for a HARQ operation, signaling of information such as new data indicator (NDI), redundancy version (RV) and modulation and coding scheme (MCS) level to a receiver is defined.

A downlink HARQ process of an LTE system is an adaptive asynchronous method. Accordingly, per downlink transmission, downlink control information for a HARQ process is explicitly involved. In contrast, an uplink HARQ process of an LTE system is a synchronous method and may be adaptive or non-adaptive. Since an uplink non-adaptive HARQ scheme does not involve explicit signaling of control information, a predetermined RV sequence, that is, a sequence of 0, 2, 3, 1, 0, 2, 3, 1, . . . , is required for continuous packet transmission. However, in an uplink adaptive HARQ scheme, RV is explicitly signaled.

The present invention proposes a buffer management method for supporting efficient downlink HARQ operation of a UE when an eNB dynamically changes usage of a specific radio resource pre-assigned to the UE to downlink resource or uplink resource according to traffic load change. First, prior to a detailed description of the proposed method, the maximum number of downlink HARQ processes for a TDD scheme defined in a TDD system based on a 3GPP LTE system is shown in Table 3 below.

TABLE 3

| TDD UL/DL configuration | Maximum number of HARQ processes |
|---|---|
| 0 | 4 |
| 1 | 7 |
| 2 | 10 |
| 3 | 9 |
| 4 | 12 |
| 5 | 15 |
| 6 | 6 |

In a TDD system, examples of a method for dynamically or semi-statically changing usage of a specific radio resource pre-assigned to an UE at an eNB include 1) a method for signaling an additional UL/DL configuration via dedicated RRC/MAC signaling (that is, an RRC/MAC reconfiguration message) to indicate change of usage of a specific radio resource and 2) a method for indicating usage of a specific radio resource using a specific field of a physical control channel, e.g., a carrier indication field (CIF) or a downlink assignment index (DAI) or a UL index. In addition, examples of a method for semi-statically changing usage of a radio resource includes a method for signaling a UL/DL configuration updated via system information such as SIB.

Figure 9:
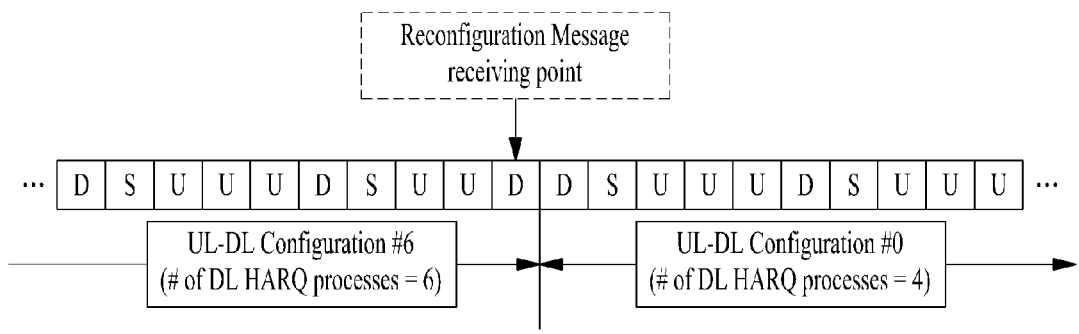
FIG. 9 is a diagram showing an example of applying a method for indicating change of usage of a specific radio resource in a TDD system.

FIG. 9 is a diagram showing an example of applying a method for indicating change of usage of a specific radio resource in a TDD system. That is, assume that, if usage of resource is dynamically changed by the method 1), a subframe configuration is changed from UL/DL configuration #6 to UL/DL configuration #0.

Referring to FIG. 9, an operation for changing usage of an already configured radio resource may cause a problem that the HARQ processes (or HARQ timings) cannot be continuously used. That is, by changing the UL/DL configuration from UL/DL configuration #6 to UL/DL configuration #0, the number of downlink HARQ processes is decreased from 6 to 4 and two downlink HARQ processes already used based on UL/DL configuration #6 are no longer continuously used.

The present invention proposes a HARQ operation for solving such a problem.

Figure 10:
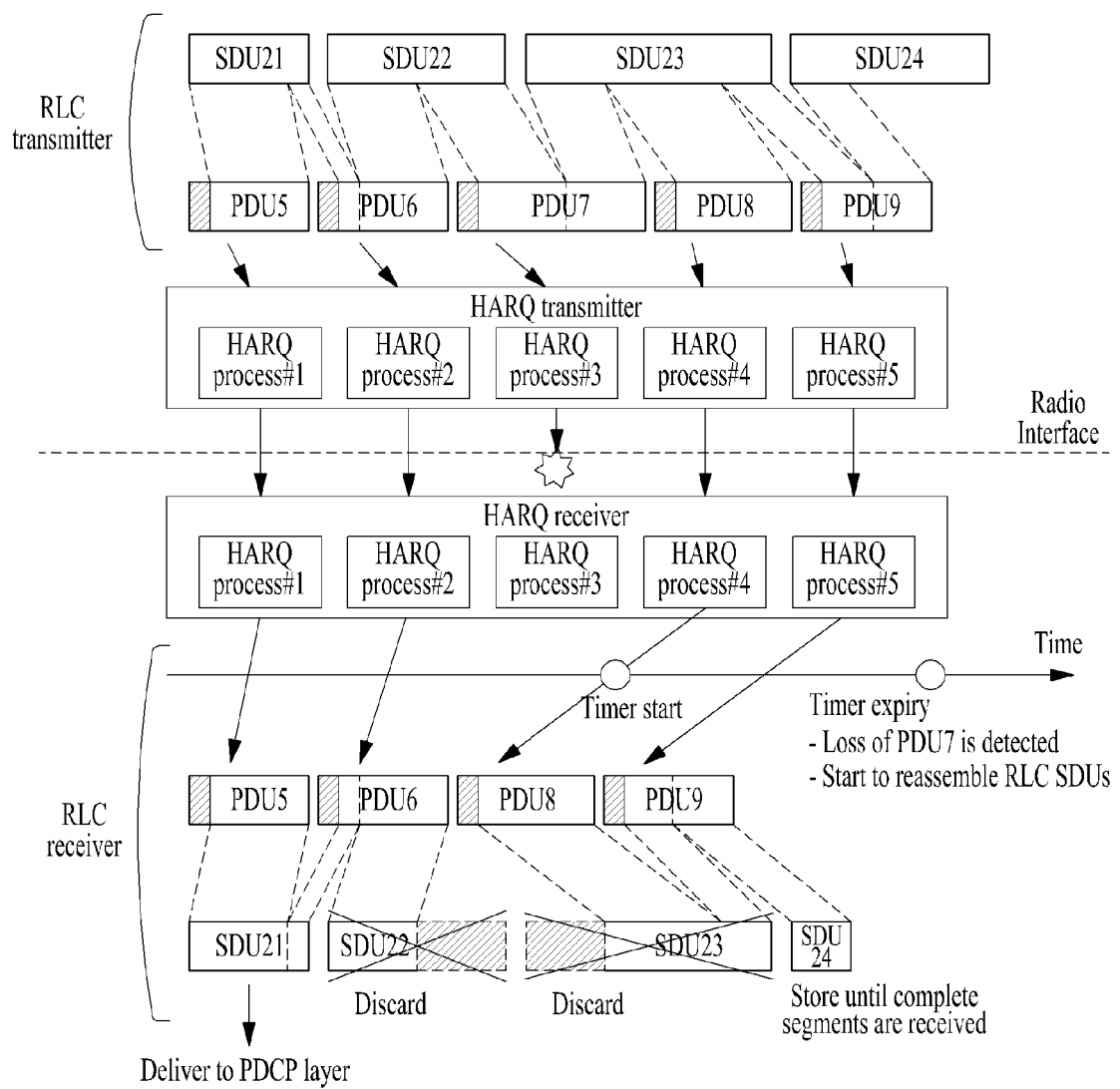
FIG. 10 is a diagram showing a HARQ operation of a MAC layer and an ARQ operation of an RLC layer in order to explain the present invention.

FIG. 10 is a diagram showing a HARQ operation of a MAC layer and an ARQ operation of an RLC layer in order to explain the present invention. In particular, in FIG. 10, assume that an RLC entity operates in a UM.

Referring to FIG. 10, the case in which PDU7 composed of some data of SDU22 and SDU23 is not successfully received by a receiver (e.g., a UE) during a predetermined specific time (that is, a specific timer driving time) for various reasons such as channel error or packet delivery error and thus SDU22 and SDU23 are discarded, is shown. In addition, since the receiver receives only some data of SDU24 from a transmitter (e.g., an eNB), the receiver stores some (received) data of SDU24 until reception of SDU24 is completed.

As can be seen from FIGS. 9 and 10, if usage of an existing radio resource is dynamically or semi-statically changed, in order to efficiently perform HARQ processes which cannot be continuously used among the HARQ processes linked to an existing radio resource configuration (or in order to terminate the HARQ processes), the RLC entity waits until a predefined timer expires. Such delay leads to restriction on the operation for efficiently changing usage of an existing radio resource and causes a problem such as average packet throughput loss and packet delay in terms of performance of the radio resource changing operation.

Accordingly, the present invention proposes methods for rapidly performing (terminating) HARQ processes which cannot be continuously supported due to change of usage of a radio resource and rapidly supporting retransmission (e.g., RLC ARQ) of an SDU related to the HARQ processes. The following methods may be implemented in a cell-specific or UE-specific manner. In addition, SDU number and SDU retransmission described below may be replaced with PDU number and PDU retransmission.

1) First, when predefined usage of a resource of a physical layer is dynamically or semi-statically changed, the MAC layer transmits, to the RLC layer, predetermined information indicating that specific HARQ processes cannot be continuously used. Here, the predetermined information may include a HARQ process ID, a predefined (virtual) HARQ process number, the number of an SDU to be retransmitted or the number of an SDU linked to HARQ processes which are no longer continuously used. In addition, the predetermined information about the HARQ processes which are no longer continuously used according to change of usage of a radio resource, which is delivered from the MAC layer to the RLC layer, may be transmitted from the transmitter to the receiver independently or along with a reconfiguration message via a specific channel (e.g., PDSCH/PDCCH) of a physical layer, higher layer signaling (e.g., RRC layer signaling/MAC layer signaling) or a system information transport channel (e.g., SIB/PBCH (MIB)).

The RLC layer, which has received the predetermined information from the MAC layer, may immediately perform retransmission of an SDU linked to the HARQ processes, which cannot be continuously used due to change of usage of a radio resource, without taking into account expiration of an existing timer, perform retransmission after a predefined time having a fixed value has elapsed without taking account of expiration of the existing timer or terminate the HARQ process without taking account of expiration of the existing timer. In the AM, in the transmitter, the RLC layer, which has received the predetermined information from the MAC layer, may immediately perform retransmission of an SDU linked to the HARQ processes, which cannot be continuously used due to change of usage of a radio resource, without receiving ACK/NACK information of the SDU from the receiver or perform retransmission after a predefined time having a fixed value has elapsed. If such operations are performed, the receiver may flush or reuse some (or all) data related to the already received specific SDU. Alternatively, if such operations are performed, the receiver may operate an "out of sequence" timer related to the SDU based on a predefined value and the value of the timer may be set to the same value as a dynamically change period of usage of a radio resource or may be set to a value relatively less than a multiple of the dynamically change period or an existing "out of sequence" timer value.

In the transmitter, the RLC layer, which has received, from the MAC layer, information indicating that specific HARQ processes are no longer continuously used due to dynamically change of usage of a radio resource, may omit or drop retransmission of the SDU linked to the HARQ processes. In this case, the transmitter may determine that the number of times of retransmission of the SDU at the RLC layer or the number of times of retransmission of the SDU at the MAC layer reaches a predetermined maximum number of times of retransmission. If such a method is applied, since retransmission of the SDU from the transmitter is not performed, the receiver may be enabled to flush the HARQ process buffer (or the RLC buffer) linked to the SDU or the SDU may be immediately regarded as being finally lost without operating the "out of sequence" timer related to the SDU at the RLC layer. Here, the "out of sequence" timer related to the SDU at the RLC layer may operate based on a predefined value and the value of the timer may be set to the same value as a dynamically change period of predefined usage of a radio resource or may be set to a value relatively less than a multiple of the dynamically change period or an existing "out of sequence" timer value. Alternatively, the RLC layer, which has received the predetermined information, may operate in a state of excluding the HARQ processes which are no longer continuously used, when selecting the HARQ process of the MAC layer used for transmission or retransmission of a specific SDU (or some data of a specific SDU). Here, a rule may be defined such that the operation for selecting the HARQ process of the MAC layer is performed based on a predefined timer value. In addition, the timer value may be set to the same value as a dynamically change period of predefined usage of a radio resource or may be set to a value relatively less than a multiple of the dynamically change period or an existing "out of sequence" timer value. In addition, the operation for selecting the HARQ process of the MAC layer may be defined such that some of the HARQ processes available when the timer expires are selected.

2) Meanwhile, if predefined usage of resource of the physical layer is dynamically or semi-statically changed, the receiver may flush a specific received SDU (or some data of the specific SDU) linked to the HARQ processes, which are no longer continuously used, from a HARQ process buffer or an RLC buffer. Further, the receiver may determine that reception of the specific SDU (or some data of the specific SDU) has failed and may not expect retransmission of the data. According to such an operation, the receiver may determine that the number of times of retransmission related to the SDU at the RLC layer or the number of times of retransmission related to the SDU at the MAC layer reaches a predetermined maximum number of times of retransmission.

Accordingly, the transmitter may retransmit the specific SDU (or some data of the specific SDU) in consideration of such an operation. In this case, the receiver may expect re-reception of the data. Similarly, the SDU may be immediately regarded as being finally lost without operating the "out of sequence" timer related to the SDU at the RLC layer. Here, the "out of sequence" timer related to the SDU at the RLC layer may operate based on a predefined value and the value of the timer may be set to the same value as a dynamically change period of predefined usage of a radio resource or may be set to a multiple of the dynamically change period or a value relatively less than an existing "out of sequence" timer value. 3) If predefined usage of resource of the physical layer is dynamically or semi-statically changed, the MAC layer may notify the RLC layer of an additionally set HARQ process timer value, an "out of sequence" timer value or a timer value for the operation for selecting the HARQ process of the MAC layer. Here, the additionally set timer value may be set to a value less than an existing timer value, the same value as a dynamically change period of predefined usage of a radio resource, a multiple of the dynamically change period, an existing timer value (e.g., an "out of sequence" timer value) for determining whether the SDU is discarded or a value relatively less than an existing timer value for determining whether the HARQ process is terminated or the SDU is retransmitted.

In addition, the additionally set timer value may be set to a common value between specific HARQ processes which are no longer continuously used, an independent value of each of the specific HARQ processes which are no longer continuously used or a value for the SDU linked to the specific HARQ processes which are no longer continuously used.

In addition, the additionally set timer value may be interpreted as a waiting time for performing retransmission of the SDU linked to the specific HARQ processes which are no longer continuously used, a waiting time until the SDU linked to the HARQ processes is discarded (e.g., "out of sequence" timer value) or a waiting time until the HARQ processes are terminated.

In addition, although the additionally set timer value may be delivered along with the predetermined information indicating that the above-described specific HARQ processes are no longer continuously used, the additional set timer value may be independently delivered.

4) The transmitter may notify the receiver communicating therewith of information indicating whether an RLC ARQ operation of the SDU linked to the HARQ processes which are no longer continuously used due to dynamically change of usage of a radio resource is performed or information about whether an RLC ARQ operation according to all the methods proposed by the present invention is performed via predefined signaling. That is, in an environment in which usage of a radio resource is dynamically changed according to a system load state, the RLC ARQ operation of the SDU linked to the HARQ processes which are no longer continuously used or the RLC ARQ operation according to all the methods proposed by the present invention may have a network configurability property.

5) In general, the HARQ process buffer is flushed if a predetermined maximum number of times of retransmission is performed or if HARQ process based communication is successfully performed and new information transmission is requested. Accordingly, in the present invention, HARQ processes which are no longer continuously used due to dynamically change of usage of a radio resource may be defined such that predetermined HARQ timeline based retransmission is (virtually) performed and the HARQ process buffers are flushed after reaching the predetermined maximum number of times of retransmission. This may be interpreted as operation for flushing the HARQ process buffers based on a predetermined timer value.

In addition, counting the number of times of retransmission of a specific HARQ process is performed based on a predefined HARQ timeline and the HARQ timeline may be defined by UL-DL configuration information before change of usage, UL-DL configuration information after change of usage, UL-DL configuration information on an SIB or representative UL-DL configuration information of UL-DL configuration candidates for change of usage.

Further, counting of the number of times of retransmission of a specific HARQ process based on a predefined HARQ timeline may be performed by taking into account a subframe usage configuration when retransmission is performed or a direction of communication to which the HARQ timeline or the specific HARQ process is linked. For example, counting of the number of times of retransmission of the specific uplink HARQ process (or the downlink HARQ process) is performed based on a predefined uplink HARQ timeline (or the downlink HARQ timeline) and a rule may be defined such that counting of the number of times of retransmission is increased according to either or both of a) and b).

a) Counting of the number of times of retransmission of the specific uplink HARQ process (or the specific downlink HARQ process) is increased without performing substantial uplink retransmission (or downlink retransmission) if a subframe when predefined uplink HARQ timeline (or downlink HARQ timeline) based retransmission is performed is used for downlink (or uplink). In particular, although the subframe when predefined uplink HARQ timeline (or downlink HARQ timeline) based retransmission is performed is used for downlink (or uplink), virtual uplink retransmission (or downlink retransmission) is regarded as being performed. In addition, it may be assumed that virtual uplink retransmission (or downlink retransmission) is not always successfully performed (that is, NACK is assumed).

b) Counting of the number of times of retransmission of the specific uplink HARQ process (or the specific downlink HARQ process) is increased depending on whether substantial uplink retransmission (or downlink retransmission) is performed, if a subframe when predefined uplink HARQ timeline (or downlink HARQ timeline) based retransmission is performed is used for downlink (or uplink) similarly to the UL-DL configuration information before change of usage or on the SIB. Here, it may be assumed that uplink retransmission (or downlink retransmission) is not always successfully performed (that is, NACK is assumed) or a rule may be determined such that a determination is made depending on whether substantial uplink retransmission (or downlink retransmission) is successful.

Counting of the number of times of retransmission of the specific uplink HARQ process (or downlink HARQ process) may be defined to be restrictively increased only when a subframe used when predefined uplink HARQ timeline (or downlink HARQ timeline) based uplink (or downlink) retransmission is performed is used for uplink (or downlink). Alternatively, counting may be defined to be restrictively increased only when the subframe used when predefined uplink HARQ timeline (or downlink HARQ timeline) based uplink (or downlink) retransmission is performed is used for uplink (or downlink) and substantial uplink retransmission (or downlink retransmission) is performed for uplink (or downlink). Such HARQ timeline information may be sent from the transmitter to the receiver via predefined signaling or a reconfiguration message.

6) The transmitter may transmit, to the receiver communicating therewith, information about dynamically change of usage of a radio resource as well as some or all of the following additional information of i) to iii) on a reconfiguration message transmitted based on predefined signaling. Here, the following additional information is only exemplary and information indicating whether the above-proposed methods apply or information about the rules of the above-proposed methods may be transmitted via the reconfiguration message. In addition, the transmitter may transmit the following additional information to the receiver via predefined signaling independent of the reconfiguration message.

The additional information may include:

i) information about HARQ processes which are no longer continuously used due to change of usage of a radio resource (e.g., a HARQ process ID or predefined virtual HARQ process number, the number of an SDU to be retransmitted or the number of an SDU linked to HARQ processes which are no longer continuously used;

ii) information indicating whether the RLC ARQ operation of the SDU linked to the HARQ processes which are no longer continuously used due to dynamically change of usage of a radio resource is performed or information indicating whether the RLC ARQ operation according to all the methods proposed by the present invention is performed; and iii) information about a HARQ process timer value of the HARQ processes which are no longer continuously used due to dynamically change of usage of a radio resource, an "out of sequence" timer value or a timer value for an operation for selecting a HARQ process of a MAC layer.

7) HARQ processes which are no longer continuously used or HARQ processes which can be continuously used after usage of a radio resource has been changed may be present. For example, the HARQ processes which are no longer continuously used after usage of a radio resource has been changed may be HARQ processes linked to flexible subframes and HARQ processes which can be continuously used after usage of a radio resource has been changed may be HARQ processes linked to static subframes.

Here, the flexible subframe means a subframe used for a purpose different from that of UL-DL configuration information on an SIB, UL-DL configuration information before change of usage, or representative UL-DL configuration information of UL-DL configuration candidates for change of predefined usage.

In contrast, the static subframe means a subframe used for the same purpose as that of UL-DL configuration information on an SIB, UL-DL configuration information before change of usage or representative UL-DL configuration information of UL-DL configuration candidates for change of predefined usage.

Accordingly, in the present invention, a rule may be defined such that a maximum number of times of retransmission is independently set per HARQ process at a MAC layer. More specifically, the maximum number of times of retransmission of HARQ processes which are no longer continuously used after change or HARQ processes which are likely to be no longer continuously used after change may be set to be relatively greater than the maximum number of times of retransmission of the HARQ processes which can be continuously used after change of usage (that is, such that an opportunity to substantially perform retransmission is stochastically increased) or be less than the maximum number of times of retransmission of the HARQ processes which can be continuously used after change of usage (that is, such that the number of times of retransmission related to a specific HARQ process reaches a predefined maximum number of times of retransmission within a relatively short period so as to rapidly flush the HARQ process buffer or use the flushed HARQ process for transmission of a new SDU).

As another embodiment, since a UE having capabilities of supporting change of usage of a radio resource and a UE no having capabilities of supporting change of usage of a radio resource coexist (or a UE in which a UL-DL configuration different from a UL-DL configuration on an SIB is specified and a UE in which the same UL-DL configuration as the UL-DL configuration on the SIB is specified coexist), a rule may be defined such that the maximum number of times of retransmission at the MAC layer (or the maximum number of times of retransmission at the RLC layer) is set (per HARQ process) due to a UE-specific property.

8) A rule may be defined such that the above-proposed methods (that is, 1) to 7)) are not applied to a specific UL-DL configuration. For example, in case of UL-DL configuration #0 or UL-DL configuration #6, a plurality of uplink HARQ processes alternately uses an uplink subframe at any point of time based on each predefined HARQ timeline. Here, in case of UL-DL configuration #0, if uplink subframe #2 is used by uplink HARQ process #X, uplink subframe #12 is used by uplink HARQ process #Y. This is different from the case in which both uplink subframe #2 and uplink subframe #12 are used by uplink HARQ process #X in case of UL-DL configuration #1.

Accordingly, the above-proposed methods (that is, 1) to 7)) may not be applied if a plurality of HARQ processes alternately uses a subframe at any point of time based on each predefined HARQ timeline like UL-DL configuration #0 or UL-DL configuration #6. This is because, in case of UL-DL configuration #0 or UL-DL configuration #6, although usage of a specific uplink subframe is changed to a downlink subframe, the subframe is alternately used by the plurality of uplink HARQ processes or the plurality of uplink HARQ processes is influenced by the subframe, usage of which has been changed, and thus the above-proposed methods (that is, 1) to 7)) are inefficiently applied.

The above-proposed methods are restrictively applicable only when a method for changing usage of a radio resource is applied. That is, the above-proposed methods are applicable only when change of usage of a radio resource is signaled. The above-proposed methods are applicable to all the cases in which the RLC ARQ operation is performed in the transparent mode (TM) or acknowledged mode (AM). The above-proposed methods are restrictively applicable only when the RLC ARQ operation is performed in a specific mode (e.g., the TM, the AM or the UM).

The above-proposed methods are restrictively applicable to downlink communication and/or uplink communication between an eNB and a UE. Further, the above-proposed methods are applicable to device-to-device (D2D) communication or communication between an eNB and a relay node.

A rule may be defined such that the above-proposed methods are restrictively applicable to a specific UL-DL configuration in a TDD system.

Further, the above-proposed methods are applicable to the case in which dynamically change of usage of a radio resource based on a predefined period is performed or the case in which dynamically change of substantial usage of a radio resource is performed based on a predefined period but transmission/reception of a reconfiguration message related thereto is performed before dynamically change of substantial usage of a radio resource is applied or at a predefined point of time before dynamically change of substantial usage of a radio resource is applied.

A rule may be defined such that the operation for transmitting the predetermined information in the above-proposed methods may be performed based on a predefined dynamically change period of usage of a radio resource or at a predefined point of time before a point of time corresponding to the predefined dynamically change period of usage of a radio resource.

A rule may be defined such that the above-proposed methods are restrictively applied only when substantial dynamically change needs to be performed at a point of time corresponding to the dynamically change period of usage of a radio resource. The HARQ processes which are no longer continuously used, described in the above-proposed methods, may be interpreted as HARQ processes which are likely to be no longer continuously used after a specific change time.

Figure 11:
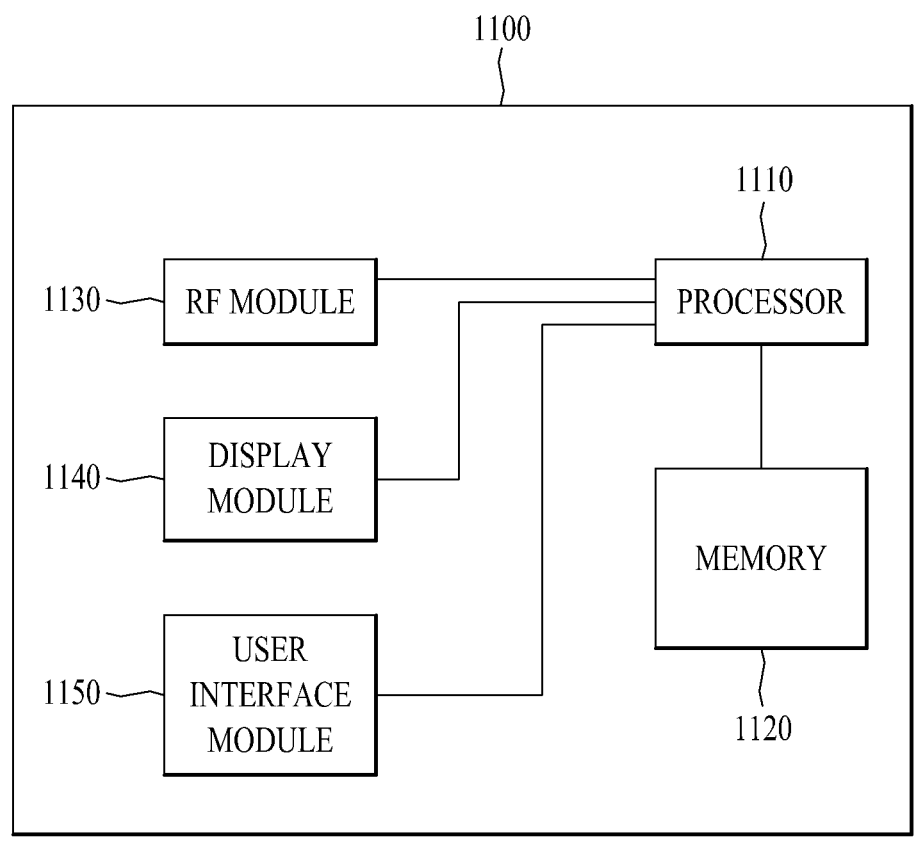
FIG. 11 is a block diagram of a communication apparatus according to one embodiment of the present invention.

FIG. 11 is a block diagram of a communication apparatus according to one embodiment of the present invention.

Referring to FIG. 11, a communication apparatus 1100 includes a processor 1110, a memory 1120, a Radio Frequency (RF) module 1130, a display module 1140 and a user interface module 1150.

The communication apparatus 1100 is shown for convenience of description and some modules thereof may be omitted. In addition, the communication apparatus 1100 may further include necessary modules. In addition, some modules of the communication apparatus 1100 may be subdivided. The processor 1110 is configured to perform an operation of the embodiment of the present invention described with reference to the drawings. For a detailed description of the operation of the processor 1110, reference may be made to the description associated with FIGS. 1 to 10.

The memory 1120 is connected to the processor 1110 so as to store an operating system, an application, program code, data and the like. The RF module 1130 is connected to the processor 1110 so as to perform a function for converting a baseband signal into a radio signal or converting a radio signal into a baseband signal. The RF module 1130 performs analog conversion, amplification, filtering and frequency up-conversion or inverse processes thereof. The display module 1140 is connected to the processor 1110 so as to display a variety of information. As the display module 1140, although not limited thereto, a well-known device such as a Liquid Crystal Display (LCD), a Light Emitting Diode (LED), or an Organic Light Emitting Diode (OLED) may be used. The user interface module 1150 is connected to the processor 1110 and may be configured by a combination of well-known user interfaces such as a keypad and a touch screen.

The above-described embodiments are proposed by combining constituent components and characteristics of the present invention according to a predetermined format. The individual constituent components or characteristics should be considered optional on the condition that there is no additional remark. If required, the individual constituent components or characteristics may not be combined with other components or characteristics. In addition, some constituent components and/or characteristics may be combined to implement the embodiments of the present invention. The order of operations disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although an example in which a method for performing hybrid automatic repeat and request (HARD) for dynamic resource change of a radio resource in a wireless communication system and an apparatus therefor is applied to a 3GPP LTE system is described, the present invention is applicable to various wireless communication systems in addition to the 3GPP LTE system.

The invention claimed is:

1. A method for performing hybrid automatic repeat and request (HARQ) at a specific layer of a receiver in a wireless communication system, the method comprising:
receiving first information indicating that a predetermined first uplink/downlink configuration changes to a second uplink/downlink configuration;
receiving second information about one or more HARQ processes from a lower layer,
wherein the second information indicates that the one or more HARQ processes cannot be supported by the second uplink/downlink configuration among HARQ processes linked to the first uplink/downlink configuration;
processing the one or more HARQ processes based on the second information when changing to the second uplink/downlink configuration, the processing of the one or more HARQ processes comprises:
terminating the one or more HARQ processes, and
retransmitting one or more service data units corresponding to the one or more HARQ processes after terminating the one or more HARQ processes.

2. The method according to claim 1, wherein the second information includes identifiers of the one or more HARQ processes.

3. The method according to claim 2, wherein the second information includes a sequence number of the service data units.

4. The method according to claim 1, further comprising receiving the second information from a transmitter via a physical layer signal.

5. The method according to claim 1, wherein the terminating of the one or more HARQ processes comprises terminating the one or more HARQ processes after a specific timer has elapsed.

6. The method according to claim 5, wherein a value of the specific timer is received from the lower layer along with the second information.

7. The method according to claim 1, further comprising flushing the service data units stored in a buffer.

8. The method according to claim 1, wherein, when the first uplink/downlink configuration is changed to the second uplink/downlink configuration, a number of downlink HARQ processes is decreased.

9. The method according to claim 1, wherein the specific layer is a radio link control (RLC) layer and the lower layer is a medium access control (MAC) layer.

10. The method according to claim 1, wherein the wireless communication system is a time division duplex (TDD) system.

11. The method according to claim 1, further comprising flushing a service data unit corresponding to the one or more HARQ processes stored in a buffer.

12. An apparatus for performing hybrid automatic repeat and request (HARQ) in a wireless communication system, comprising;
a radio frequency module configured to receive first information indicating that a predetermined first uplink/downlink configuration changes to a second uplink/downlink configuration; and
a processor configured to;
receive second information about one or more HARQ processes from a lower layer, wherein the second information indicates that the one or more HARQ processes cannot be supported by the second uplink/downlink configuration among HARQ processes linked to the first uplink/downlink configuration, and process the one or more HARQ processes based on the second information when changing to the second uplink/downlink configuration, the processing of the one or more HARQ processes comprises:

terminating the one or more HARQ processes, and retransmitting one or more service data units corresponding to the one or more HARQ processes after terminating the one or more HARQ processes.

* * * * *